Dec. 8, 1931.  E. R. WOLFERT  1,835,550
SYSTEM OF MOTOR CONTROL
Filed March 5, 1930
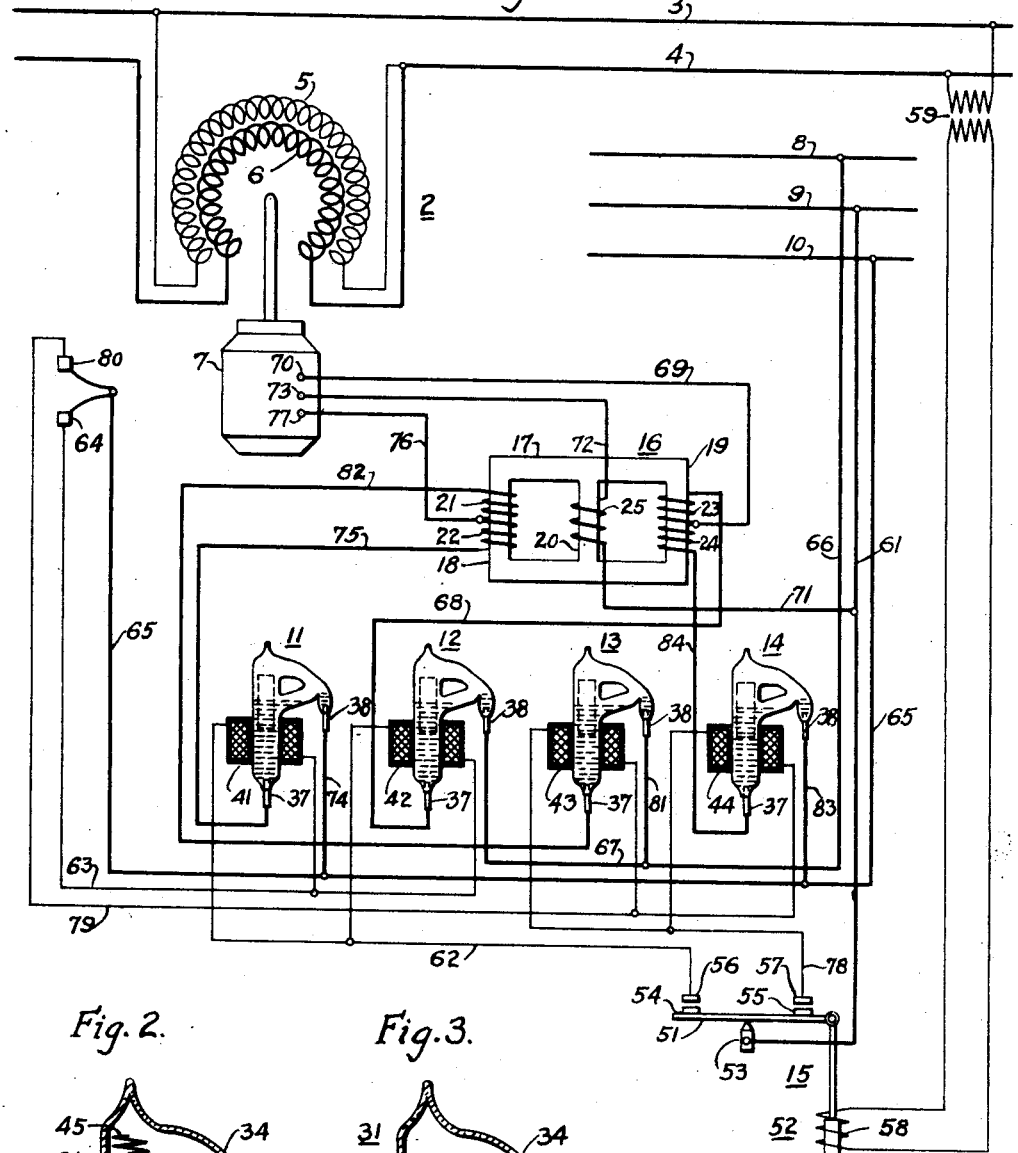
INVENTOR
Edward R. Wolfert
BY
ATTORNEY Patented Dec. 8, 1931

1,835,550

UNITED STATES PATENT OFFICE

EDWARD R. WOLFERT, OF WILKINSBURG, PENNSYLVANIA, ASSIGNOR TO WESTINGHOUSE ELECTRIC & MANUFACTURING COMPANY, A CORPORATION OF PENNSYLVANIA

SYSTEM OF MOTOR CONTROL

Application filed March 5, 1930. Serial No. 433,328.

My invention relates to systems of motor control wherein directional motor switches are employed and it has particular relation to means for limiting the flow of current in case one or more of the switches for controlling the operation of the motor in one direction should close while the switches for controlling the operation of the motor in the opposite direction are in their circuit-closing positions.

In order to control the operation of a polyphase alternating-current motor in the one or the other direction, directional or reversing switches are employed to connect the supply conductors to the motor in one of two different motor-operating relations. If certain switches, constituting a group, are closed, the supply conductors will be connected to the windings of the motor in one phase sequence or relation, and the motor will be operated in one direction. If, however, the remaining switches, constituting another group, are closed, the supply conductors will be connected to the windings of the motor in another phase sequence or relation, and the motor will be operated in the reverse direction. In order to prevent the directional switches that control the opposite directions of rotation of the motor from closing simultaneously and short circuiting the supply conductors, it is the usual practice to so interlock the two groups of switches that, when one group of switches is closed, switches of the other group cannot be closed. It is difficult to interlock certain types of switches such as those of the fluid type, which may be employed as directional switches, thus preventing them from closing simultaneously and short circuiting the supply conductors.

An object of my invention is to provide a system of motor control, employing directional switches for controlling the direction of rotation of a motor, in which the short-circuit current will be limited to a predetermined value in the event of the simultaneous closing of switches that control the operation of the motor in reverse directions of rotation.

My invention is illustrated and described as applied to a motor for operating an induction regulator but it will be obvious that it is not limited to this application.

My invention will be better understood by reference to the following description and to the accompanying drawings, in which, Figure 1 is a diagrammatic view of apparatus and circuits employed in one embodiment of my invention.

Fig. 2 is an enlarged view of a mercury switch of the plunger type in an open-circuit position, and Fig. 3 is an enlarged view of a mercury switch of the plunger type in a circuit-closing position.

Referring to the drawings, an induction regulator 2 is provided for regulating the voltage of a circuit comprising conductors 3 and 4. A primary winding 5 of the regulator 2 is connected across the conductors 3 and 4 of the circuit to be regulated, and a secondary winding 6 is connected in series-circuit relation with one of the conductors 4. A motor 7 which is illustrated as a three-phase alternating-current motor, is provided for changing the relative positions of the primary and the secondary windings of the induction regulator. The motor 7 is energized from the supply conductors 8, 9, and 10 in accordance with the operation of two groups of circuit-controlling or directional switches 11 and 12, or 13 and 14, that are selectively controlled by a primary relay or contact-making voltmeter 15 that is actuated in accordance with an electrical quantity, such as voltage, of the circuit being regulated. A reactor 16 for limiting the current in the event switches of both groups are simultaneously closed, is connected in the motor circuit, between the directional switches and the motor 7.

The reactor 16 comprises a magnetizable core structure 17 consisting of two outer legs 18 and 19 and a central leg 20 forming a three-leg core structure. Two windings 21 and 22 are provided on the leg 18, two windings 23 and 24 are provided on the leg 19, and one winding 25 is provided on the central leg 20, the respective windings having the same number of turns. The windings on each leg may be wound continuously, as shown on the drawings, or concentrically, if so desired.

As the instantaneous value of the current in any one conductor of a three-phase system, or a third conductor of a three-conductor two-phase system, is equal to the sum of the instantaneous values of the current in the other two conductors, the magnetic fields set up by these currents will have a phase relation similar to the phase relation between the currents. When these currents traverse three windings respectively having the same number of turns and being disposed on a magnetic core, the magnetic fluxes set up in the core will neutralize each other or become cumulative, depending upon the direction in which the respective fluxes are interlinked.

The windings are so wound on the legs of the core member 17 that, when windings 21, 25 and 24 are energized from the supply conductors 8, 9 and 10, the magnetic fluxes produced in the core by the currents traversing the windings will neutralize each other, and there will be substantially no reactance in the circuit connecting the supply conductors to the motor.

The windings 22 and 23 are also so wound on the core 17 that, when windings 22, 25 and 23 are energized from the supply conductors 8, 9 and 10, the magnetic fluxes produced in the core by the currents traversing the windings will neutralize each other and there will be substantially no reactance in the circuit connecting the supply conductors to the motor.

The relation of the windings on the core 17 is such that, if winding 21 and windings 22, 25 and 23 are energized simultaneously, the magnetic fluxes produced in the core 17 by the current traversing the windings will be unbalanced and there will be a resultant magnetic flux associated with the core and the windings. This resultant flux will generate an electromotive force in the windings that will cause a high impedance to be developed by the reactor 16. Similarly, the energization of the winding 23 simultaneously with that of the windings 21, 24 and 25 produces an unbalancing of the fluxes in the core 17 to create a high impedance in the reactor 16.

The motor-operated directional switches may be of the fluid type comprising a glass housing, or container 31, having a tubular body portion 32 containing an electrical conducting fluid 33, such as mercury, and an extension 34 having a constricted passage 35 which leads from the body portion to a cup-shape portion. Terminal members 37 and 38 extend through the walls of the portions 32 and 36, respectively, and make electrical contact with the conducting fluid 33. An armature member 39 of magnetizable material is placed in the body portion 32 and is adapted to float on the fluid 33. An operating winding 41 is positioned about the lower part of the housing 31 which, when energized, biases the armature 39 toward the lower part of the housing. Operating windings 42, 43 and 44 are positioned about the lower part of the housings 31 of the switches 12, 13 and 14, respectively. To prevent the armature member 39 from destroying the glass housing, cushioning means, such as spiral spring 45, are provided on the ends thereof to serve as buffers between the armature and the end walls of the housing.

The operating windings 41 and 42 of the directional switches 11 and 12, respectively, are connected in parallel-circuit relation, so that they will be energized simultaneously to close a circuit for effecting the operation of the motor 7 in one direction. The windings 43 and 44 of the directional switches 13 and 14, respectively, are also connected to be simultaneously energized to close a circuit for effecting the operation of the motor 7 in the opposite direction.

The primary relay or contact-making voltmeter 15 comprises a lever 51 actuated by an electromagnet 52 and movably supported by the pivot 53. The lever 51 carries movable contact members 54 and 55 which cooperate, respectively, with stationary contact members 56 and 57 to close circuits which actuate the directional switches 11 and 12, and 13 and 14, respectively.

Engagement of the contact members 54 and 56 completes a circuit through the operating windings 41 and 42 of the directional switches 11 and 12, respectively, to connect them to the supply conductors 9 and 10. Similarly, the engagement of the contact members 55 and 57 completes a circuit to connect the operating windings 43 and 44 of the directional switches 13 and 14, respectively, to the supply conductors 9 and 10. The electromagnet 52 is provided with an operating winding 58 that is energized from a transformer 59 in accordance with the voltage across the circuit conductors 3 and 4.

The operation of my system is as follows.

If the voltage of the circuit 3—4 decreases with respect to its desired value, energization of the electromagnet 52 will decrease to cause the core thereof to move downwardly, thus actuating the lever 51 to effect engagement of the contact members 54 and 56, thereby completing a circuit through the operating windings 41 and 42 of the directional switches 11 and 12, respectively, which extends from the supply conductor 9 through conductor 61, lever 51, contact members 54 and 56, conductor 62, through the parallel-connected operating windings 41 and 42 of the directional switches 11 and 12, respectively, conductor 63, limit switch 64, and conductor 65, to the supply conductor 10.

The operating windings 41 and 42 of the directional switches 11 and 12, respectively, are now energized and the armature members 39 are drawn downwardly to displace a part of the fluid of each switch which passes through the passages 35 and electrically connects the terminal members 37 and 38 to complete a circuit connecting the alternating-current supply conductors to the windings of the motor 7, thus causing it to operate in one direction.

The motor circuit extends from the supply conductor 8, through conductor 66, conductor 67, directional switch 12, conductor 68, winding 23 and conductor 69, to the motor terminal 70; from the supply conductor 9, through conductor 61, conductor 71, winding 25 and conductor 72, to the motor terminal 73; from the supply conductor 10, through conductor 65, conductor 74, the directional switch 11, conductor 75, winding 22 and conductor 76, to the motor terminal 77. The operation of the motor 7 changes the position of the winding 5, relatively to the winding 6, in a direction to increase the voltage on the circuit 3—4 to its desired value.

If the voltage of the circuit 3—4 increases above its desired value, the core of the electromagnet 52 will be actuated upwardly to effect engagement of the contact members 55 and 57, thereby completing a circuit through the operating windings 43 and 44 of the directional switches 13 and 14. This circuit extends from the supply conductor 9, through conductor 61, lever 51, contact members 55 and 57, conductor 78, the parallel-connected operating windings 43 and 44, respectively, of the directional switches 13 and 14, conductor 79, limit switch 80 and conductor 65, to the supply conductor 10.

The operating windings 43 and 44 of the directional switches 14 and 15, respectively, are now energized to operate the switches to their circuit-closing positions, as hereinbefore described, and to complete a circuit that connects the alternating-current supply conductors to the windings of the motor 7. The motor circuit extends from the supply conductor 8, through conductor 66, conductor 81, the directional switch 13, conductor 82, winding 21 and conductor 76, to the motor terminal 77; from the supply conductor 9, through conductor 61, conductor 71, winding 25 and conductor 72, to the motor terminal 73; from the supply conductor 10, through conductor 65, conductor 83, directional switch 14, conductor 84, winding 24 and conductor 69, to the motor terminal 70. It will be observed that the supply conductors 8 and 10 are connected to the motor terminals 70 and 77 in the reverse order from that previously described, to effect the operation of the motor 7 in the opposite direction, thus changing the position of winding 5 relatively to winding 6 and making the necessary correction to maintain the voltage of the circuit 3—4 at the desired value.

When the supply conductors 8, 9 and 10 are connected to the motor 7 in the first described operating relation by the actuation of the directional switches 11 and 12, the windings 22, 25 and 23 on the core 17 are connected in the motor circuit. The magnetic fluxes set up in the core by the currents traversing these windings neutralize each other and, therefore, do not introduce any reactance in the motor circuit.

If either of the directional switches 13 and 14 is operated to its circuit-closing position while the directional switches 11 and 12 are in their circuit-closing positions, the windings 21 and 24 will be energized. The windings 21 and 22, or the windings 23 and 24, will be connected in series-circuit relation across one phase of the supply conductors represented by the conductors 8 and 10. Under these conditions, the instantaneous magnetic flux set up by the currents flowing in the windings will not neutralize each other, and there will be a resultant flux which develops considerable reactance and, therefore, a high impedance in the windings to limit the flow of current. It follows that, if either or both directional switches 13 and 14 are closed simultaneously with either or both the directional switches 11 and 12, an unbalanced-flux condition will result in the core 17 to cause a high impedance to be developed in the windings.

When the supply conductors 8, 9 and 10 are connected to the motor 7 in the second described motor-operating relation by the actuation of the directional switches 13 and 14 to their circuit-closing positions, the windings 21, 25 and 24 on the core 17 are connected in the motor circuit. The magnetic fluxes set up by the currents traversing these windings also neutralize each other and there will be substantially no reactance in the motor circuit.

If either or both of the directional switches 11 and 12 are actuated to their circuit-closing positions while the directional switches 13 and 14 are in their circuit-closing positions, one or both of the windings 22 and 23 will be energized to cause an unbalanced condition of the magnetic fluxes in the core member, thereby introducing reactance in the motor circuit and developing sufficient impedance to maintain the current below a predetermined value.

It will be evident from the above description that I have provided protective means for a system of motor control employing directional switches in which the short-circuit current will be limited to a predetermined value in the event of the simultaneous closing of switches that control the operation of the motor in reverse directions of rotation.

Since many modifications may be made in the apparatus and circuits illustrated without departing from the spirit of my invention, I do not wish to be limited otherwise than by the scope of the appended claims.

I claim as my invention:

1. In combination, a translating device, electro-responsive means for selectively connecting a power circuit to the translating device in two different phase sequences, means for limiting the flow of current if the electro-responsive means are actuated to simultaneously connect the power circuit to the translating device in both phase sequences comprising a core having a plurality of winding legs, a winding disposed on one of said legs, two windings disposed on each of the other legs, all the windings having equal numbers of turns, one winding on each leg being connected in circuit relation with the power circuit and the translating device when the power circuit is connected to the translating device in either phase sequence, the windings on the legs being so related that the magnetic fluxes developed when the windings are energized neutralize each other when the power circuit is connected to the translating device in either phase sequence and are unbalanced when the power circuit is simultaneously connected to the translating device in both phase sequences.

2. In combination, a translating device including windings, polyphase supply conductors, a plurality of electro-responsive means for selectively connecting the supply conductors to the windings of the translating device in different phase relations, means for limiting the flow of current if the electro-responsive means are actuated to connect the supply conductors to the translating device windings in the different phase relations simultaneously comprising a core having a plurality of winding legs, a single winding disposed on one leg, two windings disposed on each of the other legs, all the core windings having equal numbers of turns, one of the windings on each leg having multiple windings being connected in circuit relation with an electro-responsive means and a winding of the translating device and the winding on the single-winding leg being connected in circuit with a supply conductor and the remaining winding of the translating device when the supply conductors are connected to the windings of the translating device in either phase relation, the windings on the legs being so related that the resultant magnetic flux in the core is substantially zero when the supply conductors are connected to the windings of the translating device in either phase relation, and there is a substantial resultant magnetic flux in the core to create a high impendance when the supply conductors are connected to the windings of the translating device simultaneously in both phase relations.

3. In combination, a translating device including polyphase windings, polyphase supply conductors, electro-responsive means for selectively connecting the supply conductors to the windings in reverse phase orders, means for limiting the flow of current when the supply conductors are simultaneously connected to the windings in both phase orders comprising a core having three winding legs, a winding disposed on one of the legs, two windings disposed on each of the other legs, all the core windings having equal numbers of turns, one of the windings on each multiple-winding leg and the winding on the single-winding leg being connected in circuit with the translating device when the supply conductors are connected in either phase order and both windings on the multiple-winding leg being connected in circuit with the supply conductors and the windings of the translating device when the supply conductors are simultaneously connected in both phase orders, the relation of the windings on the core being such that the magnetic fluxes in the core neutralize each when the supply conductors are connected in a single phase order and do not neutralize each other when the supply conductors are simultaneously connected in both phase orders.

4. In combination, a polyphase translating device including windings, polyphase supply conductors, a group of switches for connecting the supply conductors to the windings in one phase relation, a second group of switches for connecting the supply conductors to the windings in the reverse phase relation, means for limiting the flow of current when switches of both groups are simultaneously closed, thus connecting the supply conductors to the windings in reverse phase relations comprising a core having three winding legs, a single winding on one leg and two windings on each of the other legs, all the core windings having equal numbers of turns, one winding on each leg being connected in series circuit with the supply conductors and the translating device when either group of switches is closed, and both windings on one leg being connected across two conductors when switches of both groups are closed, the windings being so disposed on the core that the magnetic flux in the core is substantially zero when a single winding on each leg is energized, and the flux on the core is substantial when more than one winding on a leg is energized.

5. In a motor-control system, a polyphase motor, a plurality of switches for controlling the operation of the motor in two directions, means connected between the switches and the motor for limiting the flow of current when all the switches are simultaneously closed comprising a core having a plurality of winding legs, a winding disposed on one leg, two windings disposed on each of the other legs, the several core windings having equal numbers of turns, the relation of the windings being such that, when a winding on each leg is energized from a polyphase source, the magnetic flux in the core is substantially zero and when more than one winding on a winding leg is energized there is a substantial magnetic flux in the core to create a substantial impedance.

6. In a motor-control system, a polyphase motor, two switches for controlling the operation of the motor in one direction, two switches for controlling the operation of the motor in the reverse direction, a core having three winding legs, one winding on one leg and two windings on each of the other legs, the several windings having equal numbers of turns, a winding on each winding leg being connected between the switches and the motor when each set of switches is closed, the windings being so disposed on the core that the resultant magnetic flux in the core is substantially zero when two cooperating switches are closed, and the resultant magnetic flux is substantial if the switches that control the operation of the motor in opposite directions are simultaneously closed.

7. In a system of motor control, a polyphase motor, polyphase supply conductors, a plurality of switches for selectively connecting the motor to the supply conductors to operate in either direction, means for limiting the flow of short-circuit current when the switches for operating the motor in reverse directions are simultaneously closed comprising a core having a plurality of winding legs, a winding disposed on one leg, said winding being connected in series circuit with a supply conductor and one motor winding, two windings disposed on each of the other core-winding legs, all the core windings having equal numbers of turns, each winding on a multiple-winding leg being connected in series circuit with a supply conductor and a motor winding when the supply conductors are connected to operate the motor in one direction, the two windings on a multiple-winding leg being connected across two supply conductors when the switches that control the operation of the motor in both directions are closed, the windings being so related on the core that the magnetic fluxes developed by the windings neutralize each other when a single winding on each leg is energized and the magnetic fluxes are not neutralized when both windings on a leg are energized.

8. In combination, a polyphase translating device, a polyphase power source, means comprising phase conductors for connecting the translating device to said power source in one of two phase sequences, a polyphase reactor having a plurality of winding legs corresponding in number to the phase conductors, a winding on each winding leg, each winding being connected in series with one of said several conductors, the several windings being arranged to produce a resultant flux that is substantially zero, means for reversing the connection of two of said conductors between said translating device and said power source and for simultaneously reversing the fluxes produced thereby in the corresponding two legs of the reactor.

9. In combination, a three-phase translating device, a three-phase power circuit, means comprising three conductors for connecting the translating device to said power circuit in either of two phase sequences, a reactor comprising a core having three winding legs, means for energizing each of said three winding legs in accordance with the current flowing in a corresponding conductor of said connecting means and in a direction to produce a resultant flux that is substantially zero when the currents in the three conductors are balanced.

10. In combination, a three-phase translating device, a three-phase power circuit, means comprising three conductors for connecting the translating device to said power circuit in either of two phase sequences, a reactor comprising a core having three winding legs, means for energizing each of said three winding legs in accordance with the current in a corresponding conductor of said connecting means and in a direction to produce a resultant flux that is substantially zero when the currents in the three conductors are balanced, means for reversing the connections of two of said conductors to said translating device and for simultaneously reversing the phase relation of the flux in the corresponding winding legs of said reactor.

11. In combination, a three-phase translating device, a three-phase power circuit, means comprising three conductors for connecting the translating device to said power circuit in either of two phase sequences, a reactor comprising a core having three winding legs, a winding on each winding leg, said several windings having a like number of turns and being arranged to be connected in series with corresponding conductors of said connecting means when the translating device is connected to said power circuit in one phase sequence, the flux from the several windings having such directions as to produce a resultant flux that is substantially zero when the currents in the three conductors are balanced, a second winding on each of two winding legs having the same number of turns as the above named windings and arranged to be connected in series with corresponding conductors of said connecting means when the translating device is connected to said power circuit in another phase sequence.

In testimony whereof, I have hereunto subscribed my name this 27th day of February, 1930.

EDWARD R. WOLFERT.